US008711778B2

United States Patent
Murata (10) Patent No.: US 8,711,778 B2
(45) Date of Patent: Apr. 29, 2014

(54) WIRELESS DEVICE AND COMMUNICATION CONTROL METHOD

(75) Inventor: Syuuichi Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 13/447,362

(22) Filed: Apr. 16, 2012

(65) Prior Publication Data

US 2013/0028304 A1    Jan. 31, 2013

(30) Foreign Application Priority Data

Jul. 26, 2011    (JP) .................................. 2011-163612

(51) Int. Cl.
*H04W 4/00* (2009.01)
(52) U.S. Cl.
USPC ............................ 370/328; 370/312; 370/331
(58) Field of Classification Search
USPC ......................................... 370/328, 312, 331
See application file for complete search history.

(56) References Cited

U.S. PATENT DOCUMENTS

| 2008/0260064 A1* | 10/2008 | Shen et al. ..................... 375/267 |
| 2009/0034639 A1* | 2/2009 | Hwang et al. .................. 375/260 |
| 2011/0096727 A1* | 4/2011 | Bergman et al. .............. 370/328 |
| 2013/0195000 A1* | 8/2013 | Shen et al. ..................... 370/312 |

FOREIGN PATENT DOCUMENTS

| JP | 2010-050936 | 3/2010 |
| JP | 2010-074760 | 4/2010 |

* cited by examiner

Primary Examiner — Kenny Lin
(74) Attorney, Agent, or Firm — Fujitsu Patent Center (57) ABSTRACT

A mobile station is capable of wireless communication with a base station in a plurality of frequency bands. The mobile station includes a receiving unit, a detecting unit, an acquiring unit, and a transmitting unit. The receiving unit receives band information indicating a frequency band to be used in the wireless communication with the base station from the base station. The detecting unit detects whether a wireless module assigned wireless communication processing in the frequency band indicated in the received band information supports MIMO transmission. The acquiring unit acquires classification information identifying desired method information among method information associated with MIMO support information indicating that MIMO transmission is enabled when it has been detected that the wireless module supports MIMO transmission. The transmitting unit transmits the acquired classification information to the base station.

3 Claims, 5 Drawing Sheets

| HS-DSCH CATEGORY | MAX CODE NUMBER | MAX TBS | MODULATION METHOD | SUPPORT FOR MIMO | DC-HSDPA | MAX THROUGHPUT (Mbps) | 3GPP RELEASE |
|---|---|---|---|---|---|---|---|
| 6 | 5 | 7298 | QPSK, 16QAM | × | × | 3.649 | 5,6 |
| 7 | 10 | 14411 | | | | 7.205 | |
| 8 | 10 | 14411 | | | | 7.205 | |
| 9 | 15 | 20251 | | | | 10.125 | |
| 10 | 15 | 27952 | | | | 13.976 | |
| 13 | 15 | 35280 | QPSK, 16QAM, 64QAM | | | 17.64 | 7 |
| 14 | 15 | 42192 | | | | 21.096 | |
| 15 | 15 | 23370 | QPSK, 16QAM | ○ | | 23.37 | |
| 16 | 15 | 27952 | | | | 27.952 | |
| 17 | 15 | 35280 | QPSK, 16QAM, 64QAM | × | | 17.64 | |
| | | 23370 | QPSK, 16QAM | ○ | | 23.37 | |
| 18 | 15 | 42192 | QPSK, 16QAM, 64QAM | × | | 21.096 | |
| | | 27952 | QPSK, 16QAM | ○ | | 27.952 | |
| 19 | 15 | 35280 | QPSK, 16QAM, 64QAM | ○ | | 35.28 | |
| 20 | 15 | 42192 | | | | 42.192 | |
| 21 | 15 | 23370 | QPSK, 16QAM | × | ○ | 23.37 | 8 |
| 22 | 15 | 27952 | | | | 27.952 | |
| 23 | 15 | 35280 | QPSK, 16QAM, 64QAM | | | 35.28 | |
| 24 | 15 | 42192 | | | | 42.192 | |

FIG.3

| FREQUENCY BAND | 2 GHz | 800 MHz |
|---|---|---|
| MIMO | SUPPORTED | NOT SUPPORTED |

FIG.4

WIRELESS DEVICE AND COMMUNICATION CONTROL METHOD

CROSS-REFERENCE TO RELATED APPLICATION

This application is based upon and claims the benefit of priority of the prior Japanese Patent Application No. 2011-163612, filed on Jul. 26, 2011, the entire contents of which are incorporated herein by reference.

FIELD

The embodiments discussed herein are directed to a wireless device and a communication control method.

BACKGROUND

Conventionally, with the development of wireless communication technologies, there are known technologies for broadening communication bands by combining a plurality of antennas between a mobile station and a base station. As such a technology, MIMO (Multiple Input Multiple Output) is employed in HSPA+ (High Speed Packet Access Plus) and LTE (Long Term Evolution). MIMO is a technology for achieving broadband wireless communication in such a manner that a base station simultaneously transmits different data to a mobile station through a plurality of antennas, and the mobile station receives the data through the antennas and combines the received data. Some mobile stations are capable of expanding a communication-enabled area, some are capable of switching a plurality of different frequency bands (for example, 2 GHz and 800 MHz) to respond to a change in communication environment. Some of such mobile stations have a plurality of antennas for respective frequency bands (a total of four antennas) so as to allow MIMO communication in each frequency band.

Patent document 1: Japanese Laid-open Patent Publication No. 2010-74760
Patent document 2: Japanese Laid-open Patent Publication No. 2010-50936

The above-described mobile station has two antennas (a main branch and a sub branch) for each of two systems with respect to each frequency band. These branches are composed of RF (Radio Frequency) components; the RF components are preferably few in number from the standpoint of small footprint on the mobile station or reduction of power consumption. Furthermore, depending on an RF component, a characteristic of one branch (the sub branch) may be degraded in a particular frequency band. Especially, an operation region of an RF component is narrow in a low-frequency band of about 800 MHz; therefore, this tendency is prominent in the low-frequency band. In consideration of such circumstances, an RF component for a sub branch in a particular frequency band (for example, 800 MHz) is sometimes not implemented in a mobile station. However, as such a mobile station does not implement the RF component used for application of the MIMO technology, the mobile station does not properly perform separation, demodulation/decoding, and error correction of data received from a base station, and as a result, the above-described MIMO technology may not be applied to the mobile station.

SUMMARY

According to an aspect of an embodiment of the invention, a wireless device capable of wireless communication with other device in a plurality of frequency bands, the wireless device includes: a storage unit that stores therein MIMO support information indicating whether MIMO transmission is enabled or not, method information including at least maximum code length and a modulation method, and classification information for classifying a combination of MIMO support information and method information; a receiving unit that receives band information indicating a frequency band to be used in the wireless communication with the other device from the other device; a detecting unit that detects whether a wireless module assigned wireless communication processing in the frequency band indicated in the received band information supports MIMO transmission; an acquiring unit that acquires classification information identifying desired method information among method information associated with MIMO support information indicating that MIMO transmission is enabled from the storage unit when it has been detected that the wireless module supports MIMO transmission, and acquires classification information identifying desired method information among method information associated with MIMO support information indicating that MIMO transmission is not enabled from the storage unit when it has been detected that the wireless module does not support MIMO transmission; and a transmitting unit that transmits the acquired classification information to the other device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

Incidentally, the wireless device and the communication control method according to the present invention are not limited by the embodiments below.

[a] First Embodiment

An embodiment of a mobile station 10 as an example of the wireless device according to the present invention is explained below with reference to accompanying drawings. There is described based on the assumption that the mobile station 10 performs wireless communication with a base station 20 based on HSPA+ (High Speed Packet Access Plus), one of communication methods employing the MIMO technology. The mobile station 10 belongs to category 20 as an HS-DSCH (High-Speed Downlink Shared CHannel) category that supports HSPA+. The category 20 corresponds to 3GPP (3rd Generation Partnership Project) release 8, and is an HS-DSCH category that supports MIMO and 64QAM (64 Quadrature Amplitude Modulation). The mobile station 10 is capable of responding to communication in any categories under the category 20, such as category 14 or 19, with the base station 20.

Figure 1:
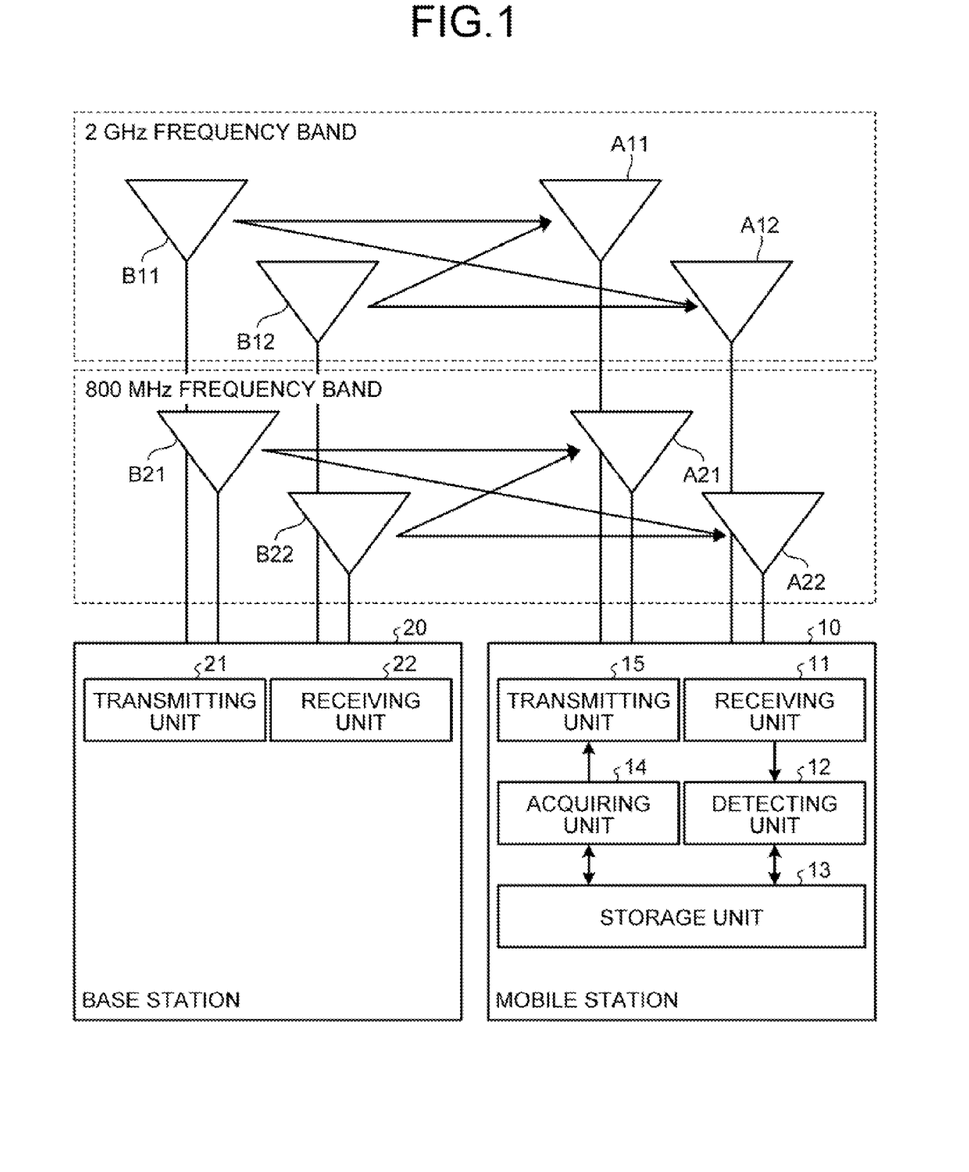
FIG. 1 is a diagram illustrating a functional configuration of a mobile station.

First, a configuration of a mobile station according to an embodiment of the present invention is explained. FIG. 1 is a diagram illustrating a functional configuration of the mobile station 10 according to the present embodiment. As illustrated in FIG. 1, the mobile station 10 includes main branches A11 and A21, sub branches A12 and A22, a receiving unit 11, a detecting unit 12, a storage unit 13, an acquiring unit 14, and a transmitting unit 15. These components are connected so as to input/output a signal or data unidirectionally or bi-directionally.

The mobile station 10 has two antennas for each of frequency bands of 2 GHz and 800 MHz. The main branch A11 and the sub branch A12 transmit and receive data with a main branch B11 and a sub branch B12 that the base station 20 has using a wireless communication channel in the 2 GHz frequency band. Likewise, the main branch A21 and the sub branch A22 transmit and receive data with a main branch B21 and a sub branch B22 that the base station 20 has using a wireless communication channel in the 800 MHz frequency band. However, in the present embodiment, an RF component used for application of the MIMO technology is not implemented in the sub branch A22 because an operation region of an RF component mounted on an antenna is narrow in a low-frequency band. Namely, it is configured that the mobile station 10 can be subject to the application of the MIMO technology in a high-frequency band of 2 GHz but is not be subject to the application of the MIMO technology in the 800 MHz frequency band.

The receiving unit 11 receives band information indicating a frequency band to be used in wireless communication with the base station 20 (in the present embodiment, 2 GHz or 800 MHz) from the base station 20. When MIMO is applied, the receiving unit 11 receives multiple data transmitted from the base station 20 with spatial multiplexing, and lifts a weight added on each data, and then combines the data. Accordingly, the mobile station 10 can achieve data communication at about double the speed as that is when MIMO is not applied. When MIMO is not applied, the receiving unit 11 receives data transmitted from the base station 20 without the spatial multiplexing.

The detecting unit 12 detects whether an RF component assigned wireless communication processing in the frequency band indicated in the band information received by the receiving unit 11 supports MIMO transmission on the basis of the frequency band for the wireless communication processing assigned to the RF component.

Figure 2:
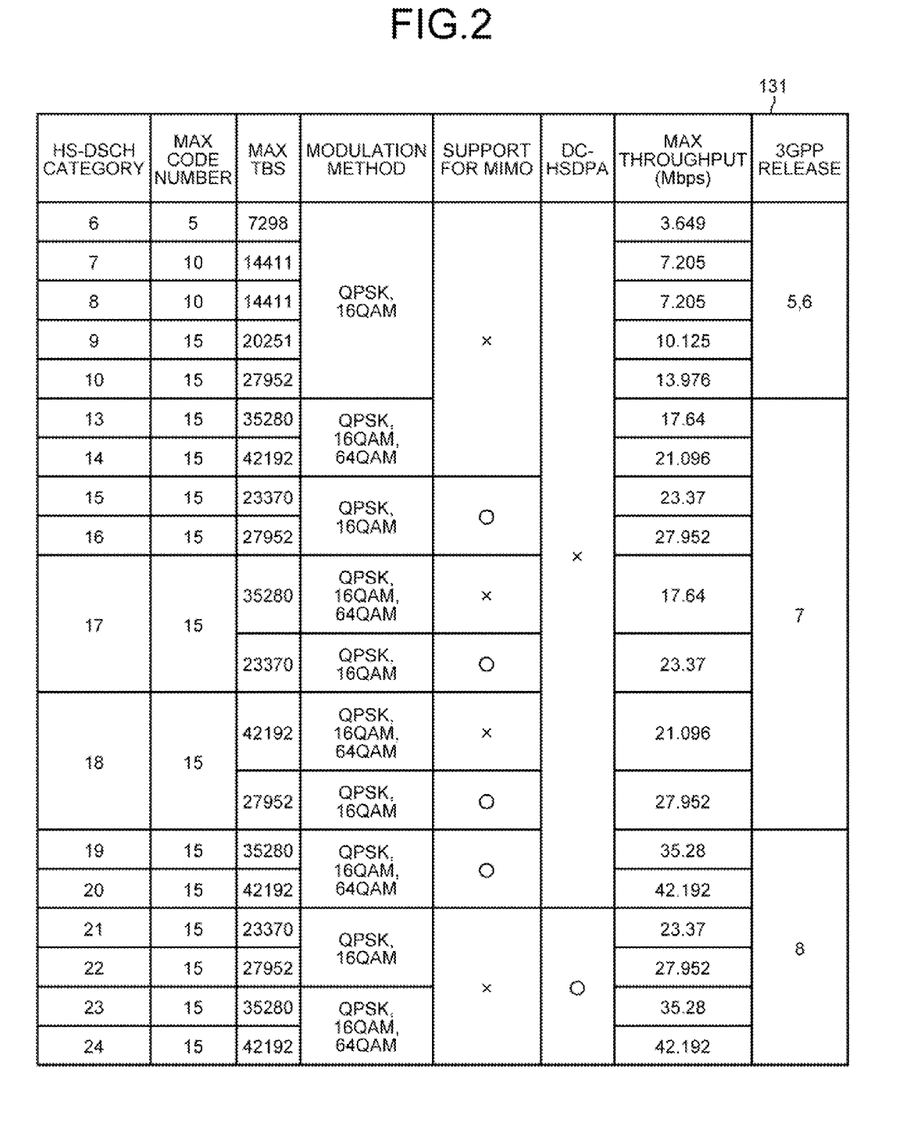
FIG. 2 is a diagram illustrating an example of a category list stored in a storage unit.

The storage unit 13 stores therein MIMO support information indicating whether MIMO transmission is enabled or not, method information including at least the max code number and a modulation method, and an HS-DSCH category for classifying a combination of MIMO support information and method information. Specifically, the storage unit 13 has a category list 131 and a MIMO-support reference table 132. The category list 131 is referenced when the mobile station 10 notifies the base station 20 of a category. FIG. 2 is a diagram illustrating an example of the category list 131 stored in the storage unit 13. As illustrated in FIG. 2, in the category list 131, each HS-DSCH category is associated with the "max code number" representing the maximum value of encoding in wireless communication, the "max TBS (Transport Block Size)" representing the maximum data size of one frame, and an applicable data "modulation method". Furthermore, the presence or absence of support for MIMO, the presence or absence of support for DC-HSDPA (Dual Cell-High Speed Downlink Packet Access), and the "max throughput (unit: Mbps)" representing the maximum transmission rate in HSDPA are also stored with respect to each HS-DSCH category. Moreover, the category list 131 includes an area in which a 3GPP release version is stored.

For example, as data corresponding to category 14 that does not support MIMO, the max code number of "15", the max TBS of "42192", and modulation methods "QPSK, 16QAM, 64QAM" are stored; furthermore, "x" representing no support for MIMO, "x" representing no support for DC-HSDPA, a max throughput of "21.096", and a 3GPP release version of "7" are stored. In the category list 131, as data corresponding to category 19 that supports MIMO, the max code number of "15", the max TBS of "35280", and modulation methods "QPSK, 16QAM, 64QAM" are stored; furthermore, "o" representing support for MIMO, "x" representing no support for DC-HSDPA, a max throughput of "35.28", and a 3GPP release version of "8" are stored. As described above, the mobile station 10 is a mobile station belonging to the category 20; however, if the mobile station 10 has the above-described data used for communication in a category other than the category 20, the mobile station 10 is capable of wireless communication in the category different from the category to which the mobile station 10 originally belongs.

Figure 3:
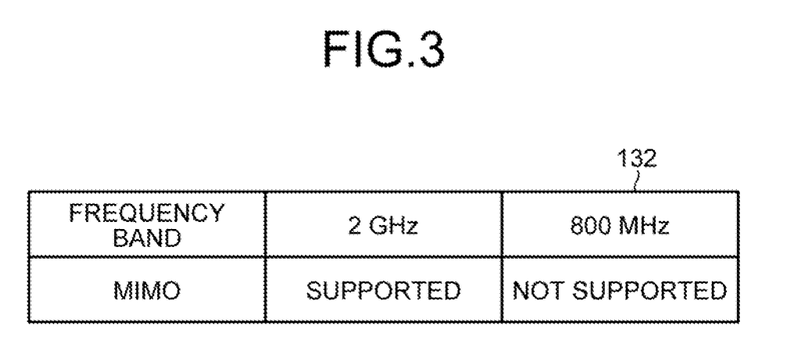
FIG. 3 is a diagram illustrating an example of data stored in a MIMO-support reference table.

The MIMO-support reference table 132 is referenced to determine whether a frequency band notified from the base station 20 supports MIMO in the mobile station 10. FIG. 3 is a diagram illustrating an example of data stored in the MIMO-support reference table 132. As described above, the mobile station 10 does not implement an RF component for the sub branch A22 in the 800 MHz frequency band; therefore, in a MIMO region corresponding to the "800 MHz" frequency band, information of "no support" is set in advance. This information is stored in a non-volatile memory 10c as internal control data of the mobile station 10, and is read out by the acquiring unit 14 to be described below when the power is turned on.

The acquiring unit 14 acquires a category (for example, categories 20 and 19) identifying desired method information (for example, the max code number of "15" and modulation methods "QPSK, 16QAM, 64QAM") among method information associated with MIMO support information indicating that MIMO transmission is enabled from the storage unit 13 when it has been detected that an RF component supports MIMO transmission. On the other hand, when it has been detected that an RF component does not support MIMO transmission, the acquiring unit 14 acquires a category (for example, categories 7 and 8) identifying desired method information (for example, the max code number of "10" and modulation methods "QPSK, 16QAM") among method information associated with MIMO support information indicating that MIMO transmission is not enabled from the storage unit 13.

The transmitting unit 15 transmits an HS-DSCH category acquired by the acquiring unit 14 to the base station 20 upon receipt of a notification of a frequency band from the base station 20.

The base station 20 includes a transmitting unit 21 and a receiving unit 22. The transmitting unit 21 notifies the mobile station 10 of a frequency band to be used in communication with the mobile station 10 out of frequency bands applicable to the mobile station 10 (2 GHz and 800 MHz). When MIMO is applied, the transmitting unit 21 breaks up data to be transmitted to the mobile station 10 into multiple pieces of data, and adds different weights to the respective pieces of data, and then simultaneously transmits the multiple pieces of data to the mobile station 10; on the other hand, when MIMO is not applied, the transmitting unit 21 transmits data to the mobile station 10 without breaking up the data. When the receiving unit 22 receives a notification of a category from the mobile station 10, the base station 20 starts HSDPA communication in the category with the mobile station 10 regardless of the presence or absence of support for MIMO.

Figure 4:
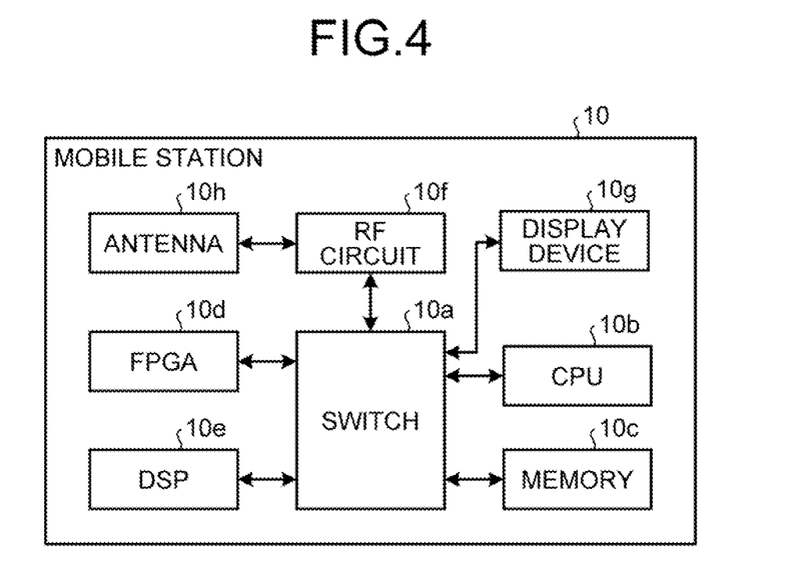
FIG. 4 is a diagram illustrating a hardware configuration of the mobile station.

FIG. 4 is a diagram illustrating a hardware configuration of the mobile station 10. As illustrated in FIG. 4, in the mobile station 10, a CPU 10b, the memory 10c, an FPGA (Field Programmable Gate Array) 10d, a DSP (Digital Signal Processor) 10e, an RF (Radio Frequency) circuit 10f, and a display device 10g are connected via a switch 10a so as to input/output various signals or data. The RF circuit 10f has an antenna 10h. The main branches A11, A21 and the sub branches A12, A22 of the mobile station 10 are realized by the antenna 10h. Furthermore, the detecting unit 12 and the acquiring unit 14 are realized, for example, by the CPU 10b or the DSP 10e. The receiving unit 11 and the transmitting unit 15 are realized by the RF circuit 10f. The storage unit 13 is realized by the memory 10c, such as a RAM (Random Access Memory), a ROM (Read Only Memory), or a flash memory.

Subsequently, the operations of the mobile station 10 and the base station 20 are explained.

Figure 5:
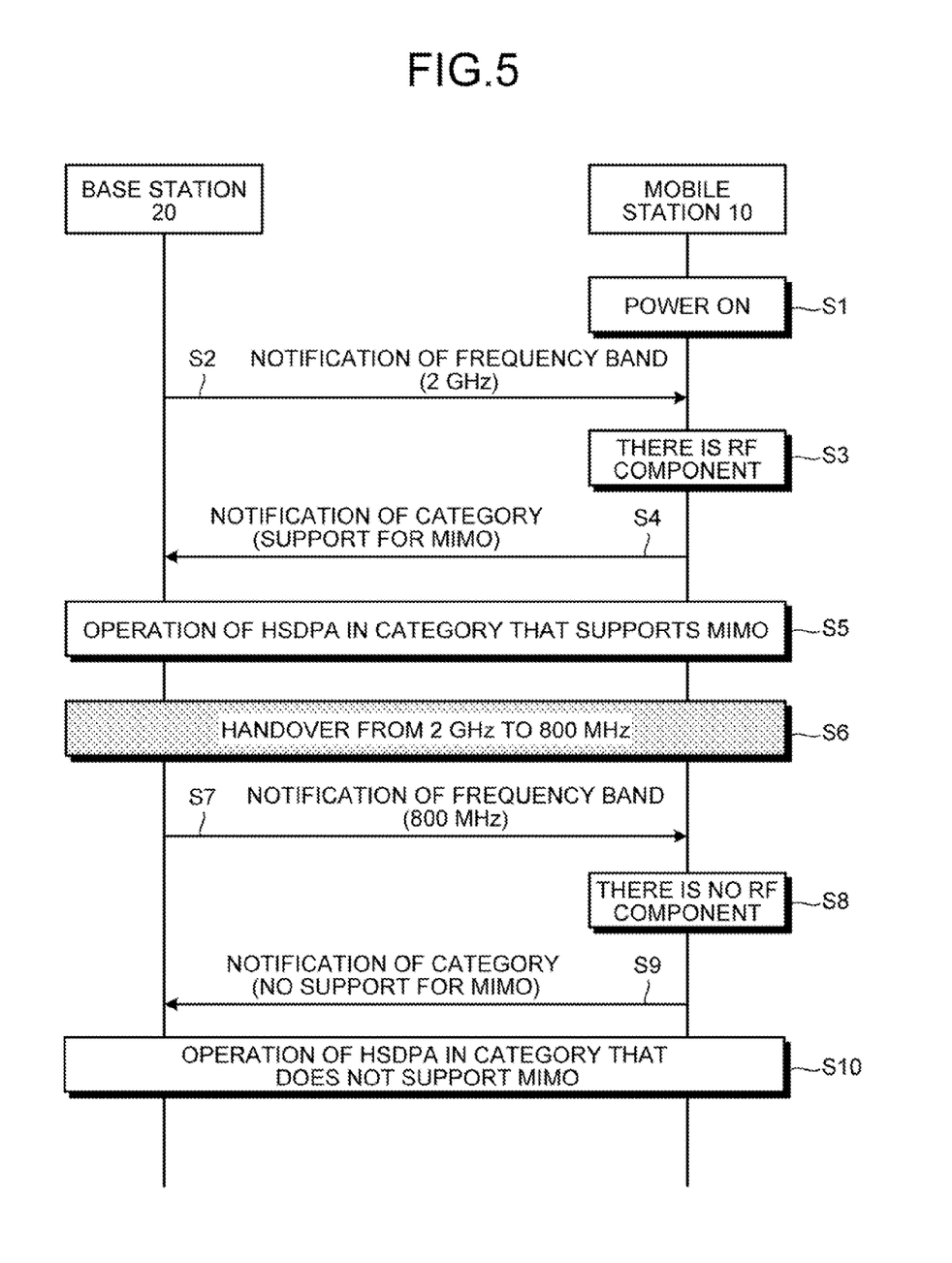
FIG. 5 is a diagram for explaining the operations of the mobile station and a base station in a first embodiment.

FIG. 5 is a diagram for explaining the operations of the mobile station 10 and the base station 20 in the first embodiment. When the mobile station 10 is powered on (S1), the mobile station 10 waits for a notification of a frequency band (an instruction for operation) from the base station 20 as the other station in communication. Upon receipt of a notification of 2 GHz band as a frequency band from the base station 20 (S2), the mobile station 10 checks the presence or absence of an RF component for the sub branch A12 in the 2 GHz frequency band. As described above, the mobile station 10 has an RF component for the sub branch A12 (S3), so MIMO transmission in the 2 GHz frequency band is enabled. Therefore, the mobile station 10 acquires a category that supports MIMO with reference to the category list 131, and notifies the base station 20 of the category (S4). Accordingly, the base station 20 starts the operation of HSDPA in the category that supports MIMO (for example, the category 20) with the mobile station 10 (S5).

After that, when the mobile station 10 has completed the handover from 2 GHz to 800 MHz due to lowering of a reception level or the like (S6), the base station 20 notifies the mobile station 10 of 800 MHz which is a new frequency band (S7). Upon receipt of the notification of the 800 MHz band from the base station 20, the mobile station 10 checks the presence or absence of an RF component for the sub branch A22 in the 800 MHz band. As described above, the mobile station 10 does not have an RF component for the sub branch A22 (S8), so MIMO transmission in the 800 MHz frequency band is not enabled. Therefore, the mobile station 10 acquires a category that does not support MIMO with reference to the category list 131, and notifies the base station 20 of the category (S9). Accordingly, the base station 20 starts the operation of HSDPA in the category that does not support MIMO with the mobile station 10 (S10). As the category does not support MIMO, the operation of an RF component for the sub branch A22 is not required.

At S9, when notified of, for example, category 14 as the category that does not support MIMO, the base station 20 recognizes that the mobile station 10 is a mobile station corresponding to the category 14, and starts the operation of HSDPA based on a non-MIMO-applicable network parameter. Therefore, the mobile station 10 side also acts as a mobile station that does not support MIMO, and can initiate wireless communication with the base station 20 without implementation of the MIMO technology (for example, implementation of reception diversity).

As explained above, the mobile station 10 according to the present embodiment is capable of wireless communication with the base station 20 in a plurality of frequency bands. The mobile station 10 includes the storage unit 13, the receiving unit 11, the detecting unit 12, the acquiring unit 14, and the transmitting unit 15. The storage unit 13 stores therein the presence or absence of support for MIMO as MIMO support information, method information, and an HS-DSCH category as classification information. The presence or absence of support for MIMO indicates whether MIMO transmission is enabled or not. The method information includes at least the max code number as the maximum code length and a modulation method. The HS-DSCH category is information for classifying a combination of MIMO support information and method information. The receiving unit 11 receives band information indicating a frequency band to be used in wireless communication with the base station 20 (2 GHz or 800 MHz) from the base station 20. The detecting unit 12 detects whether an RF component assigned wireless communication processing in the frequency band indicated in the received band information supports MIMO transmission. The acquiring unit 14 acquires an HS-DSCH category (for example, categories 20 and 19) identifying desired method information (for example, the max code number of "15" and modulation methods "QPSK, 16QAM, 64QAM") among method information associated with MIMO support information indicating that MIMO transmission is enabled from the storage unit 13 when it has been detected that the RF component supports MIMO transmission. On the other hand, when it has been detected that the RF component does not support MIMO transmission, the acquiring unit 14 acquires an HS-DSCH category (for example, categories 7 and 8) identifying desired method information (for example, the max code number of "10" and modulation methods "QPSK, 16QAM") among the method information associated with MIMO support information indicating that MIMO transmission is not enabled from the storage unit 13. The transmitting unit 15 transmits the acquired HS-DSCH category to the base station 20.

Namely, the mobile station 10 notifies the base station 20 of whether MIMO communication is enabled or not with respect to each frequency band to be used in wireless communication with the base station 20. The base station 20 switches whether to apply MIMO to wireless communication with the mobile station 10 depending on a frequency band on the basis of the notification. For example, in a case of communication in the 2 GHz band, the base station 20 acts based on the recognition that the mobile station 10 supports MIMO; in a case of communication in the 800 MHz band, the base station 20 acts based on the recognition that the mobile station 10 does not support MIMO. In other words, each time a frequency band to be used in wireless communication with the base station 20 is switched, the mobile station 10 conducts a negotiation of the presence or absence of support for MIMO with the base station 20, and performs HSDPA according to a result of the negotiation. Accordingly, the MIMO technology can be applied even to the mobile station 10 that does not implement an RF component for a sub branch in a particular frequency band. Therefore, it is possible to apply the MIMO technology to a wider range of wireless devices including the mobile station 10.

In particular, the storage unit 13 stores therein a frequency band for wireless communication processing assigned to an RF component and information on whether MIMO transmission is supported or not in an associated manner, and the detecting unit 12 detects whether the RF component supports MIMO transmission or not on the basis of the frequency band. Whether MIMO transmission is enabled or not depends on whether a mobile station implements an RF component for a corresponding frequency band. Therefore, the mobile station determines whether MIMO transmission is enabled or not on the basis of a frequency band, thereby the mobile station can easily and quickly switch to perform MIMO transmission in a frequency band for which an RF component is implemented and not to perform MIMO transmission in a frequency band for which an RF component is not implemented. As a result, it is possible to achieve communication at the highest-speed as possible not only in the frequency band for which the RF component is implemented but also in the frequency band for which the RF component is not implemented.

[b] Second Embodiment

Subsequently, a second embodiment is explained. A mobile station and a base station in the second embodiment have the same configuration as the mobile station 10 and the base station 20 in the first embodiment illustrated in FIG. 1. Therefore, components identical to those in the first embodiment are denoted by the same reference numerals, and detailed description of the components is omitted. The second embodiment differs from the first embodiment in how to share MIMO support information with respect to each frequency band. Specifically, in the first embodiment, the mobile station 10 determines the presence or absence of support for MIMO with reference to the MIMO-support reference table 132. On the other hand, in the second embodiment, the base station 20 determines whether MIMO is applied to the mobile station 10 on the basis of the MIMO-support reference table 132 transmitted from the mobile station 10. In what follows, the operations of the mobile station 10 and the base station 20 in the second embodiment, which are led by the base station 20, are explained with a focus on differences from the first embodiment with reference to FIG. 6.

Figure 6:
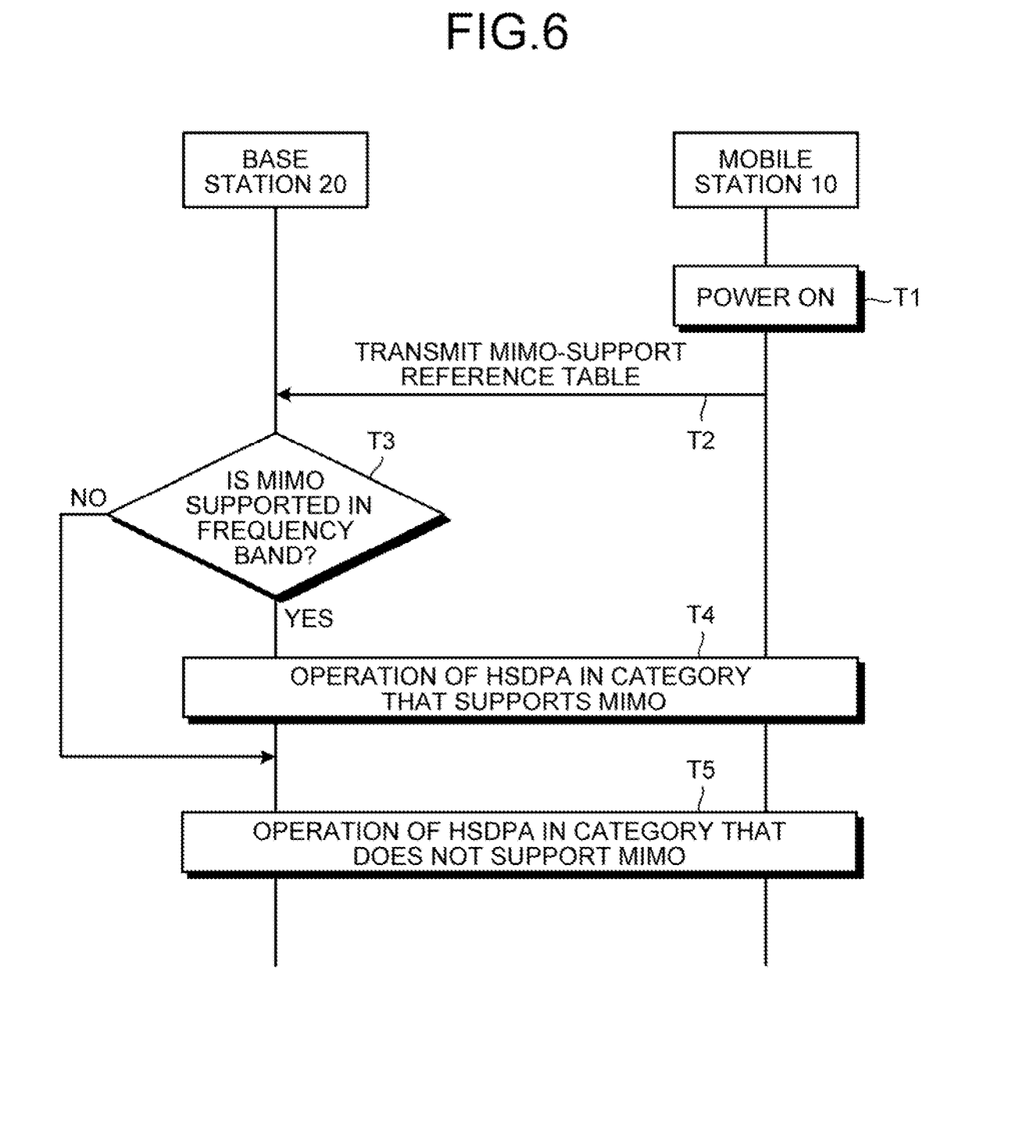
FIG. 6 is a diagram for explaining the operations of the mobile station and the base station in a second embodiment.

FIG. 6 is a diagram for explaining the operations of the mobile station 10 and the base station 20 in the second embodiment. When the mobile station 10 is powered on (T1), prior to the start of the operation of HSDPA, the transmitting unit 15 of the mobile station 10 transmits the MIMO-support reference table 132 to the base station 20. The base station 20 receives the MIMO-support reference table 132 through the receiving unit 22 (T2). In the MIMO-support reference table 132, information on whether the mobile station 10 supports MIMO or not is stored with respect to each frequency band. Accordingly, the base station 20 can determine whether MIMO transmission is applied to a frequency band to be used in communication with the mobile station 10 with reference to the received MIMO-support reference table 132. When the mobile station 10 supports MIMO in the frequency band (YES at T3), the base station 20 selects a desired category (for example, category 20) from categories that support MIMO, and starts the operation of HSDPA with the mobile station 10 in the category (T4). On the other hand, when the mobile station 10 does not support MIMO in the frequency band (NO at T3), the base station 20 selects a desired category (for example, category 14) from categories that do not support MIMO, and starts the operation of HSDPA in the category (T5).

As described above, the mobile station 10 according to the second embodiment provides the MIMO-support reference table 132 to the base station 20 at the time of connection with the base station 20. The base station 20 switches whether or not to perform HSDPA in a category that supports MIMO depending on whether a frequency band is the one that the mobile station 10 supports MIMO with reference to the MIMO-support reference table 132. Accordingly, also in the present embodiment, the same effects as in the first embodiment can be achieved. Specifically, the effects specific to the first embodiment include low cost by the implementation of the embodiment as it can be implemented by changing the control content or stored data on the side of the mobile station 10. On the other hand, the effects specific to the second embodiment include high-speed switching of whether or not to apply MIMO because HSDPA is initiated only by processing performed by the base station 20 side after the transmission of the table from the mobile station 10 to the base station 20.

Incidentally, in the first embodiment, the mobile station 10 takes a leading role in selecting a category from a plurality of categories that support MIMO or a plurality of categories that do not support MIMO. As a basis for the mobile station 10 to select a category, there are forms of focusing on any of a modulation method, a max throughput (Mbps), and a 3GPP release version; alternatively, the mobile station 10 can select a category on the basis of a combination of these as parameters, or selection priorities can be determined by adding different weights on them. For example, when the mobile station 10 selects a category to be applied to HSDPA communication from categories 15 to 20 which are categories that support MIMO, the category 20 with the maximum value (42.192) of max throughput is selected. Alternatively, the mobile station 10 can be configured to select a category corresponding to the latest 3GPP release version and the latest category number (category 20) from categories including a modulation method of 64QAM (categories 19 and 20) out of categories that support MIMO (categories 15 to 20). Accordingly, the mobile station 10 can select a category capable of higher-speed communication in categories corresponding to a notified frequency band regardless of whether MIMO is applied or not. Therefore, by notifying the base station 20 of this category, the mobile station 10 can perform higher-speed HSDPA communication with the base station 20.

Similarly, in the second embodiment, the base station 20 takes a leading role in selecting a category on the basis of whether MIMO is applicable or not in a frequency band; alternatively, in the same manner as the above-described form in which the mobile station 10 selects a category, also in a case where the base station 20 selects a category, priorities can be set. Also in such form, a category with a higher bit rate in a modulation method (i.e., higher-speed modulation), a category with a higher max throughput, and a category with a later 3GPP release version are preferentially selected. For example, when the base station 20 selects a category to be applied to HSDPA communication from categories 6 to 14, 17, 18, and 21 to 24 that are categories not supporting MIMO, the latest category 18 out of categories with the maximum value (21.096) of max throughput in categories 20 and under is selected. Alternatively, the base station 20 can select a category corresponding to the latest 3GPP release version and the latest category number (category 18) from categories including a modulation method of 64QAM (categories 13, 14, 17, and 18) out of categories 20 and under that do not support MIMO (categories 6 to 14, 17, and 18). Accordingly, the base station 20 can select a category capable of higher-speed communication in categories corresponding to a frequency band regardless of whether MIMO is applied or not.

Therefore, by applying this category to HSDPA communication with the mobile station 10, the base station 20 can achieve higher-speed communication.

Furthermore, in the above embodiments, if the mobile station 10 notifies the base station 20 of a category from which the presence or absence of support for MIMO is not identified, the mobile station 10 can notify the base station 20 of a modulation method in addition to the category. When the mobile station 10 notifies the base station 20 of a modulation method together with a category, even if the base station 20 does not determine whether MIMO is applicable or not from the category only, the base station 20 can certainly and easily determine whether MIMO is applicable or not depending on the mobile station 10 by using the modulation method as the second indicator. For example, it is assumed that the mobile station 10 notifies the base station 20 of only category 17 upon notification of a frequency band. In this case, as illustrated in FIG. 2, the category 17 includes both a modulation method that supports MIMO and a modulation method that does not supports MIMO (64QAM). Therefore, even when notified of only the category 17, the base station 20 does not accurately determine whether to apply MIMO to the operation of HSDPA. So, the mobile station 10 notifies the base station 20 of a modulation method in addition to the category 17. This enables the base station 20 to determine whether MIMO is applicable or not on the basis of whether the notified modulation method includes "64QAM". Namely, if "64QAM" is included in the modulation method, the mobile station 10 does not support MIMO, so the base station 20 starts the operation of HSDPA without applying MIMO to communication with the mobile station 10. On the other hand, if "64QAM" is not included in the modulation method, the base station 20 applies MIMO to communication with the mobile station 10. Therefore, even if the presence and absence of support for MIMO exist in the same category, the base station 20 can determine whether to apply MIMO to communication with the mobile station 10 accurately, easily, and quickly. As a result, it is possible to achieve a flexible response in the MIMO switching control.

Furthermore, in the above embodiments, there is described the MIMO technology (2×2 MIMO) implemented by a mobile station and a base station that each have two antennas per frequency band. However, the above embodiments are not limited to this form, and can be applied to 3×3 MIMO or more. Moreover, in the above embodiments, the mobile station 10 is described as a mobile station that performs communication with a base station using HSPA+ wireless communication system; however, the wireless communication system is not limited to HSPA+, and any other systems can be used as long as the MIMO technology is employed in the systems, such as LTE. Furthermore, as for a category to which a mobile station belongs, in the above embodiments, the mobile station 10 is described as a mobile station meeting HSPA+ category 20; however, the category is not limited to this, and the mobile station 10 can be a mobile station meeting any of categories that support MIMO, such as categories 15, 16, and 19.

In the above embodiments, whether to apply MIMO or not is switched depending on a frequency band; an object to be switched is not limited to this, and can be a modulation method (for example, switching between 64QAM and 16QAM). Furthermore, when the mobile station 10 belongs to category 21 or higher, an object to be switched can be whether to apply DC-HSDPA or not.

In the above embodiments, method information includes at least the "max code number" as the maximum code length and a "modulation method"; method information can further include other information, such as the above-described "max TBS". Furthermore, a frequency band to be used in wireless communication is not limited to 2 GHz and 800 MHz, and can be, for example, 1.5 GHz.

Moreover, in the above embodiments, there is described on the assumption that the mobile station is a cell-phone, a smartphone, or a PDA (Personal Digital Assistant); however, the present invention can be applied not only to such a mobile station but also to various communication devices to which the MIMO technology can be applied.

Furthermore, the components of the mobile station 10 illustrated in FIG. 1 do not always have to be physically configured as illustrated in the drawing. Namely, specific forms of division and integration of the components are not limited to those illustrated in the drawing, and all or some of the components can be configured to be functionally or physically divided or integrated in arbitrary units depending on various loads or use conditions. For example, the detecting unit 12 and the acquiring unit 14 or the receiving unit 11 and the transmitting unit 15 can be integrated into one component. Contrarily, the acquiring unit 14 can be divided into two parts: a part that acquires a category when it has been detected that an RF component supports MIMO transmission and a part that acquires a category when it has been detected that an RF component does not support MIMO transmission. Moreover, the memory 10c can be configured as an external device, and the memory 10c can be configured as an external device and connected to the mobile station 10 via a network or a cable.

According to an aspect of a mobile station disclosed in the present application, it is possible to apply the MIMO technology to a wider range of wireless devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless device capable of wireless communication with other device in a plurality of frequency bands, the wireless device comprising:
    a storage unit that stores therein MIMO support information indicating whether MIMO transmission is enabled or not, method information including at least maximum code length and a modulation method, and classification information used to classify a combination of the MIMO support information and the method information;
    a receiving unit that receives band information indicating a frequency band to be used in the wireless communication with the other device from the other device;
    a detecting unit that detects whether a wireless module assigned wireless communication processing in the frequency band indicated in the received band information supports MIMO transmission;
    an acquiring unit that acquires the classification information identifying desired method information among the method information associated with the MIMO support information indicating that MIMO transmission is enabled from the storage unit when it has been detected that the wireless module supports MIMO transmission, and acquires the classification information identifying desired method information among the method information associated with the MIMO support information indicating that MIMO transmission is not enabled from the storage unit when it has been detected that the wireless module does not support MIMO transmission; and a transmitting unit that transmits the acquired classification information to the other device.

2. The wireless device according to claim 1, wherein
the storage unit further stores therein a frequency band for wireless communication processing assigned to the wireless module and information indicating whether MIMO transmission is supported or not in an associated manner and the detecting unit detects whether the wireless module supports MIMO transmission or not on the basis of the frequency band.

3. A communication control method of a wireless device capable of wireless communication with other device in a plurality of frequency bands, the communication control method comprising:

receiving band information indicating a frequency band to be used in the wireless communication with the other device from the other device;

detecting whether a wireless module assigned wireless communication processing in the frequency band indicated in the received band information supports MIMO transmission;

acquiring classification information identifying desired method information including at least maximum code length and a modulation method among method information associated with MIMO support information indicating that MIMO transmission is enabled when it has been detected that the wireless module supports MIMO transmission and acquiring the classification information identifying desired method information among the method information associated with the MIMO support information indicating that MIMO transmission is not enabled when it has been detected that the wireless module does not support MIMO transmission; and transmitting the acquired classification information to the other device.

* * * * *